Sept. 7, 1948.  R. L. HOUGH  2,448,980
STEM AND SOCKET COMBINATION
Filed Oct. 1, 1945
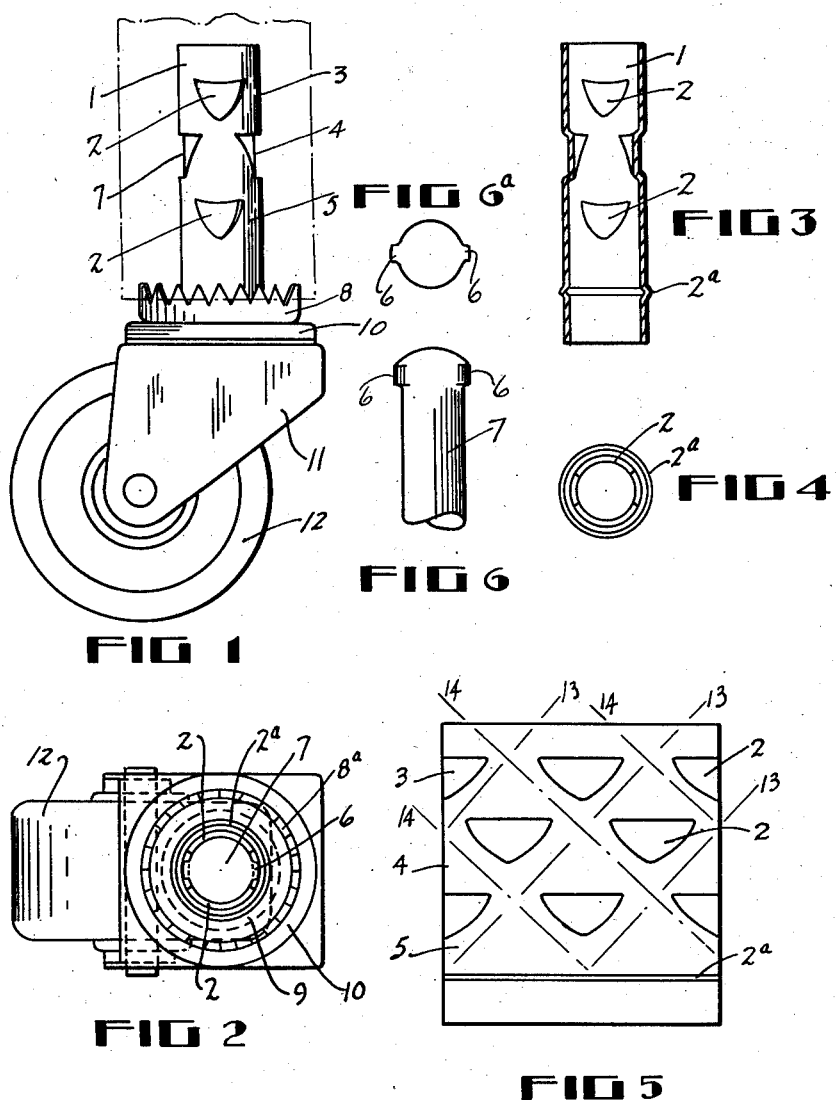
INVENTOR
R. L. HOUGH
by [signature]
Attorney Patented Sept. 7, 1948

2,448,980

UNITED STATES PATENT OFFICE 2,448,980

STEM AND SOCKET COMBINATION

Richard Leighton Hough, Brantford, Ontario, Canada

Application October 1, 1945, Serial No. 619,551

6 Claims. (Cl. 16—38)

1

This invention relates to an improved stem and socket combination for use in casters and the like.

One object of this invention is to provide a stem and socket combination in which the stem can be inserted in the socket and removed from the socket by rotating it in either direction, without the use of force, and without danger of pulling the socket from its place.

Another object of this invention is to provide a stem and socket combination in which the stem is securely held in the socket even when the combination is raised from supporting surfaces such as a floor.

A further object of this invention is to provide a stem and socket combination in which the stem has a limited amount of free lateral and longitudinal movement with respect to the socket.

A further object of this invention is to enable the stem and socket combination to be readily and economically manufactured and in particular to enable the socket to be made from material of thinner gauge than is normally employed.

According to my invention, there is provided in a stem and socket combination, a stem having a lug extending outwardly from its side, and a socket having staggered rows of raised portions on its inner surface extending around the inside of the socket and forming spiral and annular sockets therebetween for the passage of said lug.

The novel features of the invention as shown in a preferred embodiment forming part of a caster will hereinafter appear in detail in the description that follows and are illustrated in the accompanying drawings in which similar reference characters indicate corresponding parts and in which Figure 1 is an elevation of the preferred form of my invention, showing the socket and grip collar secured in the leg of a piece of furniture, which is shown in cross-section, and the caster with its stem inserted in the socket.

Figure 2 is a plan view thereof.

Figure 3 is a vertical cross-section of a socket.

Figure 4 is a plan view of the socket.

Figure 5 is a developed side elevation of the socket.

Figure 6 is a fragmentary elevation of the stem.

Figure 6a is a plan view thereof.

The cylindrical socket 1 has embossed thereon a plurality of substantially triangular inwardly projecting raised portions 2, and an outwardly projecting annular rib 2a around the lower end thereof. The apices of the raised triangular portions are directed towards the lower end of the socket and the bases are slightly concave and sub-

2 stantially parallel to the upper edge of the socket 1. The inner surface of each raised portion is substantially flat in the vertical plane and curved in the horizontal plane to conform to the internal curvature of the rest of the socket. The corners of the raised portions are rounded.

The raised portions 2 are arranged around the periphery of the socket in three rows 3, 4 and 5, each row comprising two raised portions, and the raised portions in rows 3 and 5 are in vertical alignment while the raised portions in row 4 are horizontally displaced, their apices being midway between the adjacent raised portions in rows 3 and 5. The spaces between the edges of the raised portions 2 form spiral recessed paths or channels for the passage of lugs 6, 6 on the stem 7 as hereafter described, and annular recessed paths above and between each row of raised portions.

As will be seen from Figures 1 and 3 the socket is formed of a single piece of sheet metal bent to cylindrical shape.

The raised portions and the rib are stamped in the socket by means of a suitable die and the interior die member may be removed after the stamping or dieing operation by spreading the edges of the socket. After the socket has been formed the edges may be soldered or butt welded but they are shown in the drawing as merely meeting without any joint.

A grip collar 8 is inserted over the end of the socket 1 and the end of the socket is turned to form a flange 9 for retaining the grip collar 8 in the socket between said flange 9 and the rib 2a. The collar 8 has upwardly extending teeth 8a. The socket is inserted in a hole in the leg of a piece of furniture or other object and the teeth may be forced into the object to retain the socket in the hole in the same manner that conventional sockets are secured to objects.

A stem 7 is attached to plate 10 of a yoke 11 which supports a caster wheel 12. A pair of lugs 6, 6 extend from the sides of the stem at the upper end thereof, and form a lead therefor.

To support the caster in the socket the end of the stem is inserted in the socket and is rotated in either direction with an upward moment so that the lugs 6 pass upwards along paths 13 or 14 until the lugs are above the top row 3 of raised portions 2. As two sets of diagonal paths 13 and 14 are provided the stem may be rotated either way. When the plate 10 contacts the lower face of the collar 8 the lower surfaces of the lugs 6 are above the upper edge of the raised portions 2 which allows free movement (see Figure 2).

To remove the stem from the socket, it is rotated in either direction with a downward moment so that the lugs 6 pass downwards along the screw paths 13 or 14.

The convex base of each raised portion 2 assists in giving the stem a limited amount of free lateral movement while tending to control the position of the lugs 6 when the caster assembly is lifted from the floor on which it rests.

Should the lugs be turned while lifting the caster assembly above the floor so that they slide off the top row 3 of raised portions 2 and fall or are pulled between adjacent raised portions thereby withdrawing the stem from the socket, the lugs will catch on one of the raised portions 2 in row 4 which are staggered with respect to those of row 3; and if the lugs are again turned so that they slide off row 4 and drop or are pulled between adjacent raised portions in row 4 they will catch on the raised portions 2 of row 5 which are staggered with respect to those of row 4. It is therefore apparent that the chance of the stem falling out of the socket is negligible.

While the invention has been described with particular reference to a caster it is not to be limited thereto but is to be construed broadly and restricted solely by the scope of the appended claims.

What I claim as my invention is:

1. For use with a stem having a lug extending from its side, a socket having staggered rows of raised portions on its inner surface extending around the inside of the socket and forming spiral and annular channels therebetween for the passage of the lug.

2. For use with a stem having a lug extending from its side, a socket having staggered rows of raised substantially inverted triangular portions on its inner surface extending around the inside of the socket and forming spiral and annular channels therebetween for the passage of the lug.

3. For use with a stem having a lug extending from its side, a socket having staggered rows of raised substantially inverted triangular portions on its inner surface extending around the inside of the socket and forming spiral and annular channels therebetween for the passage of the lug, the corners of the raised portions being rounded.

4. For use with a stem having a lug extending from its side, a socket having staggered rows of raised substantially inverted triagular portions on its inner surface extending around the inside of the socket, the apex of each raised triangular portion in one row being opposite the space between adjacent raised portions in the next row, and forming spiral and annular channels therebetween for the passage of the lug.

5. For use with a stem having a lug extending from its side, a socket having staggered rows of raised substantially inverted triangular portions on its inner surface extending around the inside of the socket and forming spiral and annular channels therebetween for the passage of said lug, the bases of the triangular raised portions being concave to hold the lug.

6. For use with a stem having a lug extending from its side, a socket having staggered rows of raised portions on its inner surface extending around the inside of the socket and forming spiral and annular channels therebetween for the passage of the lug, the centre lines of said raised portions in each row being opposite the space between the raised portions in adjacent rows.

RICHARD LEIGHTON HOUGH.

REFERENCES CITED

The following references are of record in the file of this patent:

UNITED STATES PATENTS

| Number | Name | Date |
| --- | --- | --- |
| 177,903 | Warren | May 23, 1876 |
| 238,673 | Garretson | Mar. 8, 1881 |
| 772,863 | Bischoff | Oct. 18, 1904 |
| 1,344,418 | McAllister | June 22, 1920 |